Figure 1:
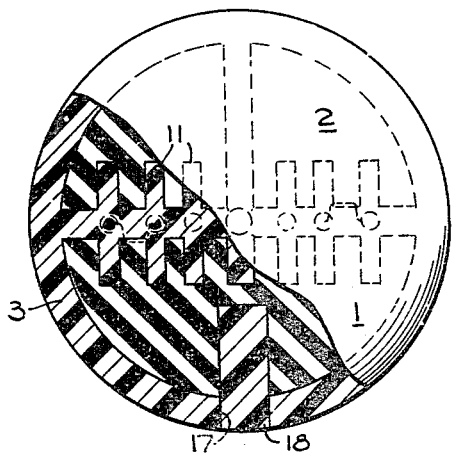

May 21, 1963   J. W. CONSOLLOY   3,090,620
BOWLING BALL
Filed April 4, 1958

INVENTOR.
JAMES W. CONSOLLOY
BY Edward J. Dwyer
ATTORNEY

United States Patent Office 3,090,620
Patented May 21, 1963

3,090,620
BOWLING BALL
James W. Consolloy, Pennington, N.J., assignor to The Electric Storage Battery Company, a corporation of New Jersey
Filed Apr. 4, 1958, Ser. No. 726,433
3 Claims. (Cl. 273—63)

This invention generally relates to bowling balls and other similar objects such as duck pin balls and the like. More specifically, the present invention relates to a new and improved bowling ball, having a construction permitting the utilization of suitable synthetic resins for the outer shell.

An object of the present invention is to provide a bowling ball having an outer shell of a plastic material which not only will meet the specifications of the American Bowling Congress for a regulation bowling ball but also will have the tone and feel of a conventional bowling ball.

Another object of the present invention is to provide a bowling ball which shows good resistance to physical abuse and which has a high impact resistance.

Still another object of the present invention is to provide a bowling ball in which the balance of the ball can be controlled to a higher degree than in a conventional ball.

Conventional bowling balls are made by preforming a center core of a low grade hard rubber composition. The center core is then surrounded with a preformed shell of a high grade of hard rubber and placed in a final mold for vulcanization in an autoclave during which the inner core and outer shell are molded or bonded together. After vulcanization, the molded ball is ground or lathed to the proper dimensions and finally polished. It takes a relatively long period of time to manufacture a bowling ball by this process. For example, the vulcanization of hard rubber sections of the size of a bowling ball may take as long as eight hours or more, depending on the grade of hard rubber used. During this time, the mold is unavailable for further production. In addition, a considerable amount of labor is needed to preform the sections, assemble them, and fit them into the final mold.

Accordingly, a further object of the present invention is to provide a bowling ball which can be manufactured in a relatively short period of time with a considerable saving in labor.

Another object of this invention is to provide a new and improved bowling ball which can be manufactured in a range of colors, heretofore unavailable.

The foregoing and other objects of the present invention are achieved by molding, to the desired weight, two hemispheres or half cores of hard rubber or other suitable material. The half cores are adapted to be aligned with respetct to each other to provide a spherical inner core. To give additional strength to the ball, the inner core is made to exert an outward stress on the outer shell which is molded around it. This is accomplished by lowering the temperature of the inner core to cause it to contract and assume minimum dimensions for the molding operation. The chilled inner core is then positioned on the locating pin in the mold and an outer shell of synthetic resin is molded around it while it is at a reduced temperature. As the core returns to room temperature, during and after the molding operation, it expands, stressing the outer shell and adding to the physical strength of the ball. After the ball is removed from the mold, the hole caused by the locating pin is filled with the material of the outer shell and the ball finished to the proper dimensions.

Figure 4:
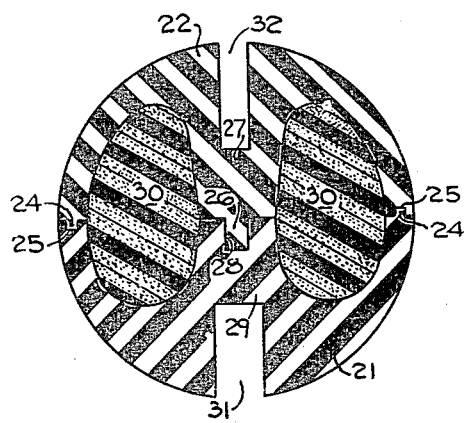
Figure 3:
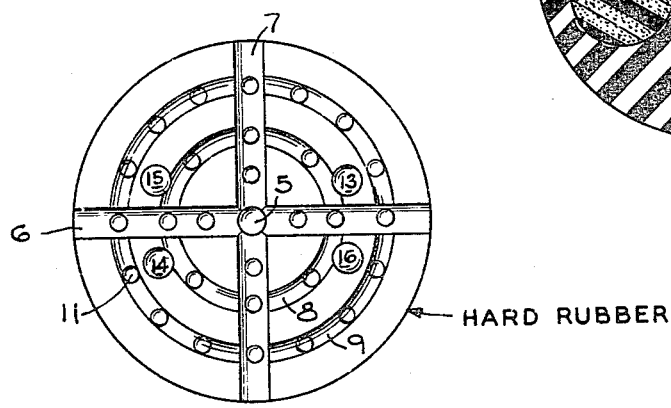
Figure 2:
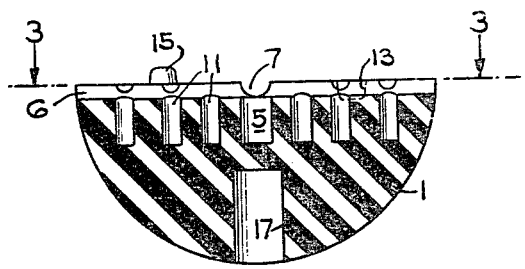

A better understanding of the present invention may be had from the following description read with reference to the accompanying drawings of which:

FIG. 1 is a side elevation of the bowling ball of the present invention partially in cross section;
FIG. 2 is a sectional elevation of half core 1 of the bowling ball shown in FIG. 1;
FIG. 3 is a bottom view taken along the lines 3—3 of FIG. 2; and
FIG. 4 is a sectional elevation of the core of a lightweight bowling ball.

Referring now to the drawings, the numerals 1 and 2 designate hemispherical half cores of material having the required weight, mechanical strength and temperature characteristics. The half cores 1 and 2 are individually molded to give the bowling ball the needed weight and the weight distribution. For a standard weight bowling ball, it has been found satisfactory to mold half cores 1 and 2 of hard rubber. By controlling the density of the hard rubber used for the half cores 1 and 2, finished balls can be made in the conventional weight range. For lighter weight balls, the half cores 1 and 2 may be made of a lighter weight material or of hard rubber having hollow portions filled with a light weight composition as shown in FIG. 4. By molding the core of the ball in half sections, the weight distribution of the ball can be easily controlled. To this end, the half core into which the finger holes are to be drilled is usually made heavier than the other half core to compensate for the material to be removed.

As shown in FIG. 1, the half cores 1 and 2 are surrounded with an outer shell 3 of a suitable material. The structure of the bowling ball of the present invention and the process by which it is manufactured make it possible to utilize a great variety of materials for the outer shell. Compounds of various plastics, synthetic resins, resins, rubber, rubber-like materials, or an alloy in any proportion of this material, with or without inert fillers, either thermoplastic or thermosetting which will provide the necessary characteristics may be employed. By way of illustration and example and not by way of limitation, synthetic resins such as and similar to acrylonitrile-butadiene-styrene-copolymers, polyvinyl chloride and nylon have been found satisfactory for the outer shell 3. Of these, polyvinyl chloride has been found very practical not only because it has certain hitherto unsuspected characteristics which lend themselves very favorably to the production of a ball comparing to the conventional hard rubber bowling ball but also because it is easily molded and economical to use. Such synthetic resins such as polyvinyl chloride do, however, give processing advantages not available with hard rubber. Still further, they can be made to have a tone and feel comparable with those of the conventional bowling ball.

Unlike the conventional hard rubber bowling ball in which there is a bond between the inner core and the outer shell, there is no bond between the half cores 1 and 2 and the outer shell 3 in the ball of the present invention. Accordingly, other means have been provided to unite the half cores 1 and 2 with each other and with the outer shell 3. To this end, the half cores 1 and 2 are provided with interlocking runners 5, 6 and 7 and a plurality of concentric reinforcement rings 8 and 9. As shown, a plurality of cavities 11 are molded in the half cores 1 and 2 extending inward from the interlocking runners 5, 6 and 7 and interlocking rings 8 and 9. During the molding of the outer shell 3, the polyvinyl chloride or other synthetic resin used for the shell 3 fills the interlocking runners 5, 6 and 7 and the interlocking rings 8 and 9 and the cavities 11. This unites the outer shell 3 with the half cores 1 and 2 and helps to provide a strong union between these parts.

To give additional strength to the bowling ball of the present invention, the center core, comprised of the half cores 1 and 2, is made to exert an outward stress on the outer shell 3. This is accomplished by chilling, that is, lowering the temperature, of the center core formed by the half cores 1 and 2, prior to the molding of the outer shell 3. As a result of this chilling, the half cores 1 and 2 are contracted to minimum dimensions for the molding operations. As the half cores 1 and 2 return to room temperature, during and after the molding operation, they expand, exerting an outward stress on the outer shell 3. In addition to providing a stronger union between these parts, the expansion of the center core adds to the physical strength of the bowling ball.

The chilling of the center core can be accomplished by storing the premolded half cores 1 and 2 in a freezing cabinet or by some other suitable means. It will be understood that the temperature to which the inner core is reduced is a relative matter depending upon such factors as the thermal coefficient of expansion of the material of the inner core, the temperature rise of the inner core in the time period between chilling and molding, and the molding temperature. By way of example, however, reducing the temperature of the inner core to approximately zero degrees Fahrenheit has proven satisfactory. In any event, the inner core will be chilled substantially below room temperature. After chilling, the center core formed by the half cores 1 and 2 is positioned on a locating pin in the outer shell mold. In order to facilitate the alignment of the half cores 1 and 2 with respect to each other, each of the half cores are provided with two alignment cavities 13 and 14 and two alignment dowels 15 and 16 of the half core 1 which are adapted to fit into the alignment cavities 13 and 14 of the half core 2 and vice versa. To provide for positive alignment of the half cores 1 and 2 in the final mold, the half core 1 is provided with a cavity 17, adapted to receive the locating pin and properly position the half cores in the final mold.

After the inner core is positioned in the outer shell mold, the material of the outer shell 3 is molded around it under pressure. In order to assure that the inner core remains in proper alignment with respect to the outer shell mold, the molding gate, through which the outer shell material is introduced into the mold, is preferably located directly opposite the locating pin. With the molding gate opposite the locating pin, the force of the molded material is borne by the locating pin and distributed equally over the surface of the inner core. Still further, with the core in this position with respect to the molding gate, the interlocking passage 5 furnishes a recess for the material of the cold or jet shot which would otherwise occur on the surface of the molded ball. The cold or jet shot is the first material introduced into the mold, which upon release from the molding pressure as it enters the mold, cools rapidly and unevenly and thus would introduce a weakness in the surface of the ball due to a lack of welding with adjacent material. In this respect, it should be noted that chilling of the inner core contributes substantially to reducing the molding time especially when thermoplastic type synthetic resins are used.

After molding, the ball is removed from the outer shell mold and the cavity 17 and the void in the outer shell 3, caused by the locating pin, is filled with the material of the outer shell 3. This may be accomplished by cementing or solvent welding a plug of the synthetic resin in the cavity 17 and the void in the outer shell caused by the locating pin. This hole may also be filled by remolding using material similar to that of the outer shell. The molded ball may then be turned on a lathe or ground to the proper dimensions and polished. In this respect, less finishing is required for the bowling ball of the present invention than for a conventional bowling ball because closer tolerances can be maintained in the molding process than can be obtained in the manufacture of a hard rubber ball. In addition, it is possible to control the balance of the ball to a higher degree since the half cores 1 and 2 are rigidly positioned with respect to the outer shell mold by the locating pin. The entire process for producing a bowling ball as disclosed herein can be performed in less than one hour from the molding of the half cores to the finished, polished ball.

Referring now to FIG. 4, there is shown a sectional elevation of the core of a lightweight bowling ball. This core comprises two hemispherical half cores 21 and 22 of hard rubber or other suitable material which form a spherical inner core when aligned with respect to one another. In order to facilitate the alignment of the half cores 21 and 22 with respect to each other, each of the half cores are provided with a plurality of alignment dowels 24 and alignment cavities 25 along the perimeter of their outer shells. The alignment dowels 24 on the half core 21 are adapted to fit into the alignment cavities 25 in the half core 22 and vice versa. In addition, the half core 22 is provided with a large alignment dowel 26 on its center portion 27 which is adapted to fit into the alignment cavity 28 in the center portion 29 of the half core 21. When united, the half cores 21 and 22 provide a substantially hollow shell having an inner circumferential cavity 30. As shown, the hollow portion of the half core 21 is more shallow than the hollow portion of the half core 22. This insures that when finger holes are drilled into the half core 22 they will not extend into the cavity 30. In this respect, it should be noted that the drilling of finger holes will remove a sufficient amount of material to properly balance the ball. The inner cavity 30 may be filled with a lightweight plastic such as a polyurethane resin foam which, in addition to adding to the strength of the ball, provides a means for uniting the two half cores. Other lightweight materials both synthetic and natural are suitable for filling the lightweight spheres.

The manufacture of a lightweight ball, using the half cores 21 and 22, is substantially the same as the manufacture of bowling balls previously described with the exception of the introduction of the polyurethane resin or other lightweight filler into the cavity 30. Since polyurethane resin foam adheres to hard rubber as well as to itself, it provides a means for bonding the half cores 21 and 22 together. The cavity 30 may be filled by introducing the polyurethane resin into the cavity in one of the half cores and foaming it in the cavity with the other half core in place. In foaming the polyurethane fills the cavity 30 and adheres to the hard rubber thus uniting the two half cores into a strong lightweight spherical core.

As shown, a cavity 31 is provided in the half core 21 which is adapted to receive the locating pin and position the core in the outer shell mold. In addition, a cavity 32 is provided in the half core 22, opposite the locating pin cavity 31 in the half core 21, which is adapted to receive the cold shot of the outer core molding. Like the core shown in FIGS 1 through 3, the core shown in FIG. 4 is chilled prior to the molding of the outer shell. After chilling, the lightweight core is placed in the mold, the outer shell is molded around it and the ball is finished as as described hereinbefore.

A specific advantage of the bowling ball of the present invention is that it is adapted to be manufactured in a range of colors heretofore unavailable. Conventional hard rubber bowling balls are restricted in their color possibilities. The bowling balls of the present invention, on the other hand, can be produced in a variety of colors ranging from pastels to rich solid tones in addition to marbelized finishes in the same color range. Plastics can be colored by using a standard coloring process such as adding colored pigment to the plastic while on mills or in Banbury mixers or simply by dry blending.

By utilizing the manufacturing process described above, it will be obvious to those skilled in the art that it is possible to produce in a relatively short period of time and with a considerable saving of labor, a bowling ball not only comparable in every way with the conventional hard rubber bowling ball but a ball capable of being produced in a range of colors heretofore unavailable. In addition, by employing the unique structure which has been illustrated and described, it is possible to produce a bowling ball which has an exceptionally high impact strength and which shows good resistance to physical abuse.

Having described this invention, that which is claimed as new is:

1. A bowling ball of standard size and shape comprising, in combination, two half cores of a substantially incompressible material, each of said half cores having a plurality of alignment cavities and alignment dowels adapted to mate with the alignment dowels and the alignment cavities of the other and align said half cores to form a spherical inner core, a plurality of interlocking passages and cavities in said inner core, and an outer shell of a different substantially incompressible material molded around said inner core, the material of said outer shell filling said interlocking passages and cavities thereby uniting said core with said outer shell, said inner core stressing said outer shall.

2. A bowling ball of standard size and shape comprising, in combination, a pair of half cores of a substantially incompressible material aligned with respect to each other to form a substantially spherical center core, interlocking passages in said center core, and an outer shell of a different substantially incompressible material, the material of said outer shell filling said passages and uniting said inner core to said outer shell, said inner core exerting an outward stress on said outer shell to form a substantially incompressible unit.

3. A bowling ball of standard size and shape comprising, in combination, an inner core of a substantially incompressible material controlling the weight and weight distribution of the ball, a plurality of interlocking passages and cavities in said core, and an outer shell of a different substantially incompressible material surrounding said core, the material of said outer shell filling said interlocking passages and cavities thereby uniting said inner core with said outer shell, said inner core exerting an outward stress on said outer shell to increase the impact strength of said ball.

References Cited in the file of this patent

UNITED STATES PATENTS

| | | |
|---|---|---|
| 531,103 | Dokkenwadel | Dec. 18, 1894 |
| 716,245 | Kempshall | Dec. 16, 1902 |
| 780,582 | Richards | Jan. 24, 1905 |
| 1,240,438 | Griffiths | Sept. 18, 1917 |
| 2,061,604 | Winterbauer | Nov. 24, 1936 |
| 2,166,950 | German et al. | July 25, 1939 |
| 2,289,872 | Brinkmann | July 14, 1942 |
| 2,291,738 | Luth et al. | Aug. 4, 1942 |
| 2,482,190 | Kramer | Sept. 20, 1949 |
| 2,487,218 | Brinkmann | Nov. 8, 1949 |
| 2,654,179 | Bacon | Oct. 6, 1953 |
| 2,684,504 | Sell | July 27, 1954 |
| 2,710,487 | Scott | June 14, 1955 |

FOREIGN PATENTS

| | | |
|---|---|---|
| 312,178 | Great Britain | Aug. 21, 1930 |